Nov. 13, 1962         J. J. OROS         3,063,465
VALVE STRUCTURE AND LINKAGE THEREFOR
Filed July 21, 1959
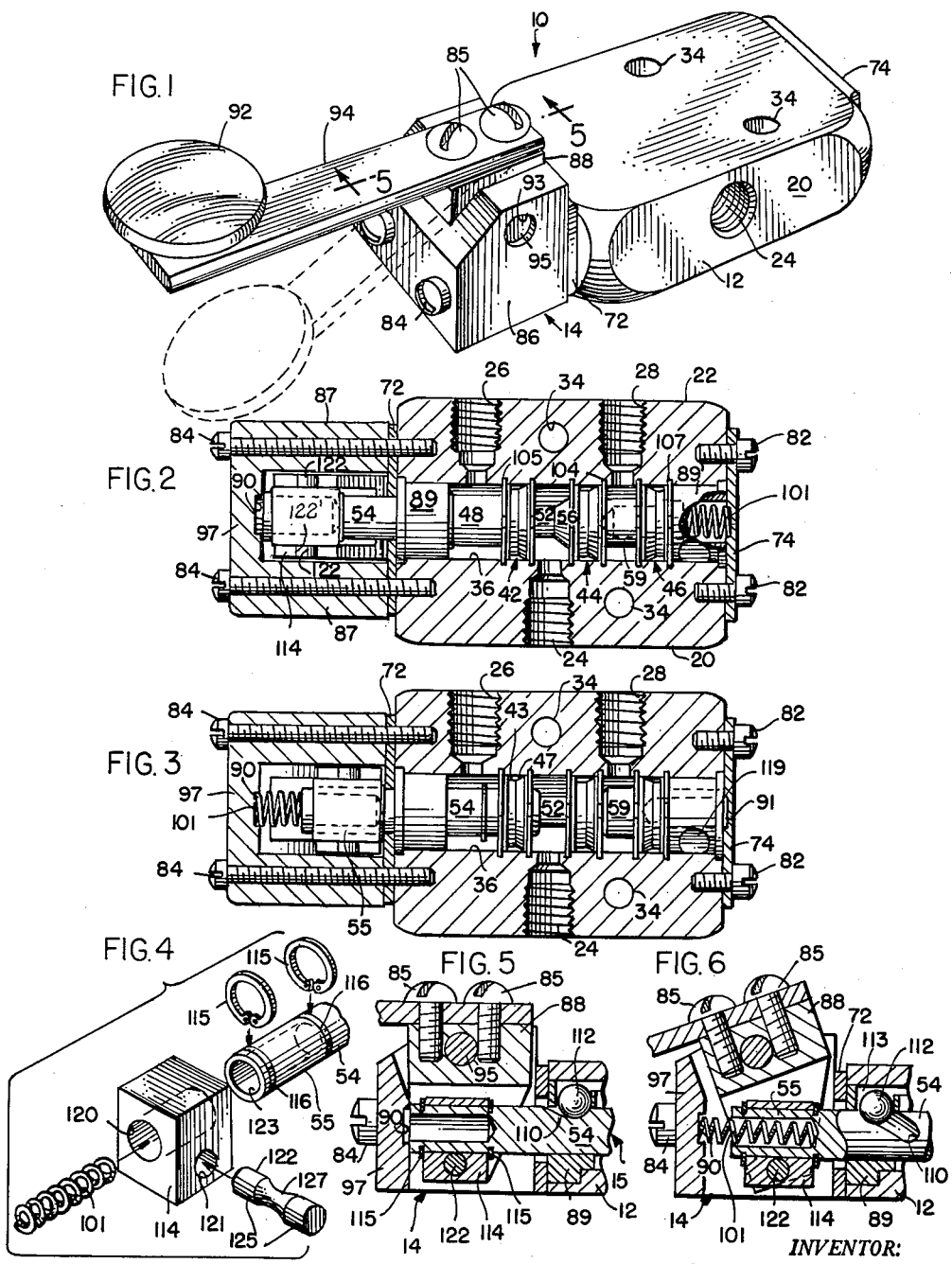
INVENTOR:
JOHN J. OROS
BY
Silverman, Mullin & Cox
ATT'YS

United States Patent Office 3,063,465
Patented Nov. 13, 1962

3,063,465
VALVE STRUCTURE AND LINKAGE THEREFOR
John J. Oros, Skokie, Ill., assignor to Air-Mite Devices, Inc., Chicago, Ill., a corporation of Illinois
Filed July 21, 1959, Ser. No. 828,622
9 Claims. (Cl. 137—270)

This invention relates generally to valve structures and more particularly, is concerned with a novel structure for a pneumatic or fluid valve and linkage for operating the same whereby the valve may be easily interchangeably biased in any one of several predetermined positions without the need for adapters, additional parts, or complex manipulative procedures.

This application is a continuation-in-part of my copending application Serial No. 743,356, filed June 20, 1958, and entitled "Valve Structure and Linkage Therefor," now Patent No. 2,965,131, issued December 20, 1960. The invention herein is an improvement over the structure disclosed in said application and is concerned with valves of the same general character and description wherein there is a reciprocable member having necked portions along its axial length, said member being reciprocated within a housing or chamber having a system of ports therein adapted to be covered and uncovered in various combinations through said movement thereby controlling the flow of fluids such as oils, air and the like.

Prior devices meeting the requirements of this type of valve were basically characterized by complicated structures and were expensive to produce and install. Complicated liners, precise grooving and undercutting, and other complex means were employed to prevent leakage between the inlet and outlet ports, between the internal chambers and the valve-body exterior and/or between the chambers within the structure. Nevertheless, none of these constructions are completely foolproof in operation, one of the primary weaknesses being that because of the reciprocating movement of the plunger or elongate member the packing heretofore provided is subjected to such stress that it is distorted or displaced out of its prearranged position within the chamber.

My co-pending application disclosed a valve structure comprising an integral housing having a passageway therein, port means communicating with said passageway, a plunger or ram reciprocable in said passageway, novel packing means cooperating with said passageway and plunger to establish selected communication paths through said passageway between said port means upon reciprocating movement of said plunger, said plunger and passageway having cooperative formations to provide chambers for said paths during said reciprocating movement and means were also provided for causing at least a partial rotation of said plunger during said reciprocating movement substantially simultaneously therewith for decreasing frictional resistance by said packing means to relative movement between said plunger and passageway. The means for causing rotation of the plunger could be generally described as a cam and follower arrangement coupled between the plunger and the housing.

The above referred to application was also concerned with providing an efficient operating linkage for said valve which would provide sufficient force necessary to move the reciprocable member, said linkage being capable of giving a substantial stroke with little driving movement while working in conjunction with the twisting plunger so that rotation of said member is permitted simultaneously with the axial movement thereof. In conjunction with this linkage, special coupling means were required whereby limited rotation of the ram or plunger was made possible in addition to the coupling purpose of said means.

The invention herein is concerned primarily with the problem of interchangeably biasing the reciprocating member of my valve structure whereby the normal or rest position of said valve may be changed without the replacement of the valve in the system, with the minimum of down-time, and without numerous adapters, additional parts, or complicated manipulative operations. In the above described valve structure, the normal or rest position of the plunger was fixed at a single position in said passageway whereby the fluid flow was directed through a particular combination of the ports and the necked down portions of the ram and the actuation of the valve would cause the flow to be diverted through another combination of ports and the ram. In numerous applications of these valve structures, it is desired to interchange the normal or rest position of the valve.

In my earlier structure, the valve could not easily be interchanged to a different rest setting. Once said valve was placed in a system, and the system required later change of the rest position, the valve would either have to be replaced or complicated adapters would be required. In many instances, the actuating means would have to be placed on the opposite side of the valve in order to change said position. Of course, in most applications the location of the actuating linkage is required to be accessible to the operator or in other words facing in a particular direction depending upon the system involved. Therefore, it is a considerable advantage that the actuating means may remain on the same side of the valve housing on change of said rest position.

It is the object of this invention to provide an improved valve structure utilizing the basic construction disclosed in my co-pending application and having the advantages thereof, and additionally being provided with means whereby the valve may be biased to interchangeably operate in any one of selected rest positions without the need for adapters, additional parts or complex manipulative operations.

Another object of the invention is the provision of a valve structure wherein merely by minor disassembly of the actuating means and the transposition of the biasing means for the reciprocable plunger from one end to the other will accomplish the biasing of the valve in a second rest position thus enabling the valve to be permanently installed in the system even though the direction of normal flow through the said valve may be desired to be changed.

A further object of the invention is the provision in a valve of the character described of means whereby said valve may be interchangeably biased in one of selected rest positions, said means basically comprising providing the reciprocable member of the valve with imperforate portions in both ends thereof, and spring biasing means adapted to be selectively placed in either end of said reciprocable member depending upon the rest position desired, and novel linkage and coupling means are provided whereby said valve is actuated.

Still another object of the invention is to provide said plunger with improved coupling means and linkage means whereby actuation of the plunger will substantially simultaneously rotate said plunger, yet will still accommodate said biasing means associated with said valve.

Another object of the invention is to provide a coupling means for said plunger and linkage whereby the rotation of said plunger is not limited by the nature of its connection to the actuating linkage.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a perspective view of a valve structure embodying the invention showing the position of the actuating linkage for one condition of rest position in solid lines, and showing the other rest position in broken lines.

FIG. 2 is a sectional view taken on a horizontal median plane of the structure shown in FIG. 1 with the valve ram being biased to a first position.

FIG. 3 is a view similar to FIG. 2 but showing the valve ram biased to a second position, opposite to the first.

FIG. 4 is an exploded perspective view of the parts by means of which the ram end is coupled with the operating linkage.

FIG. 5 is a fragmentary sectional view through the left hand portion of the structure of FIG. 1 taken generally on a plane defined at 5—5 and in the direction of the arrows, the ram being disposed in the first biased position.

FIG. 6 is a view similar to that of FIG.5 but in this case the ram is biased in the second position.

Prior to entering a detailed explanation and description of the structure which is illustrated in the drawings and which embodies the invention, it is appropriate to briefly describe the general uses of the valve structure contemplated by the invention. Basically the valve structure controls the flow of a fluid, usually air or hydraulic oil, but not excluding water or other liquids or gases, such control not being necessary for metering purposes but for the application of fluid pressure to the performance of work. Primarily, this application is practically represented by a cylinder of well known form which admits the fluid behind a piston, thereby actuating the piston and reciprocating a linkage to which the piston is attached. Forms of cylinders of this general type are hydraulic and air cylinders. The structural differences usually involve stringency of packing requirements.

There are also various constructions possible for said cylinders as determined by a particular application. There are double acting cylinders which are required to apply a force in both directions of the piston, single-acting cylinders in which force need be applied only in one direction, and various other arrangements requiring power to be applied and retained on one stroke, the pressure from a main line to be shut off and on quickly, or in combination with various functions.

Thus there are five way valves, four way valves, three way valves and two way valves, the invention herein being applicable to all of these although illustrated in connection with a three way valve only. The particular structure which is illustrated has an inlet port and an outlet or exhaust port, while there is a single fluid passageway port to the actuated cylinder. Through manipulation of the finger-lever or other structure, actuating the ram or stem of the valve, the direction of flow of fluid through the cylinder is changed.

The invention, therefore, although illustrated as a three-way manually operated valve structure, is readily applicable to any of the arrangements mentioned and to a variety of others. An important characteristic of the invention is its universal applicability to a great deal of different applications.

Basically the structure of the invention comprises a body or housing 10 which is extremely simple due to the nature of the invention, and hence is formed of a solid block of metal suitably bored and tapped as required. Although said body or housing could be made up of several pieces of metal held together by clamps or bolts or the like, and these could be cast or forged, the block is preferred to be an integral member, of aluminum for example, with the necessary recesses and ports formed as required. Aluminum is ideal because it is light, substantially non-corrosive, is readily worked and machined and can be color coded by color anodization.

The valve structure is designated generally by the reference character 10 which includes the mechanism contained within the rectangular block 12 but does not include the actuating mechanism generally designated by reference character 14 and connected with the valve structure 10 at the left hand end as viewed in FIG. 1. For the convenience of description only, this left hand end will be referred to as the front end.

The block 12 forms the body or housing within which the ram or stem 15 (see FIG. 5) reciprocates and hence will be further referred to as a housing, since the valving action is caused by cooperation between the ram 15 and the housing 12. The housing is generally rectangular in cross section on a horizontal plane, with the surface 16 considered the top, and is substantially lesser in vertical thickness than in width in the horizontal plane. The corners are rounded, but this, as well as the exact configuration are matters of design choice alone.

The elongate sides of the housing 12 are 20 and 22, which may be considered the cylinder side and the source side respectively. These designations are merely for the purpose of convenience and not meant to be limitations. The cylinder side 20 has a port 24 which leads by suitable conduit means (not shown) to the chambers of the device which is to be actuated by the fluid controlled by the valve structure 10. The source side 22 has two ports, 26 and 28, one of which is adapted for connection to a supply line for fluid and comprising an inlet, and the other being an exhaust port for the valve structure. The housing 12 may be bolted or otherwise secured to a piece of apparatus in a system by means of holes vertically bored therethrough and indicated at 34.

The ram 15 is adapted to reciprocate within the elongate passageway 36 which is formed in the housing 12 throughout its entire length. This passageway 36 is of substantially uniform cylindrical configuration except for an enlarged portion at each end thereof. Each of the ports 24, 26 and 28 communicates with the passageway 36 by suitable conduits which intersect the passageway. Thus the axes of the conduits connecting the ports with the passageway 36 and the axis of the passageway itself all lie in substantially the same plane for compact structure. In referring to the ports hereinafter, the entire recess including the conduit from the respective side of the housing 12 to the passageway 36 will be considered the port. Suitable tapered threads, or any means for providing a union or pressure connection with the conduit leading fluid externally from the valve structure or to it may be used.

There are three packing assemblages which are positioned within the passageway 36 and designated generally as 42, 44 and 46, starting from the left. The two assemblages 42 and 44 are disposed between ports 26 and 28, but must be separated sufficiently so that the port 24 opens into passageway 36 between said assemblages. Another packing assemblage (not shown) conveniently would be disposed to the left of the port 26 to assist in containing air or gas.

Each of the assemblages 42, 44 and 46 is formed of the same number of parts, and is similar to the packing assemblages disclosed in my co-pending application. The grooved faces of the packing members 42 and 44 face toward the right in passageway 36, while the grooved face of packing member 46 is directed toward the left.

The assemblage 42 also includes a pair of flat washers 104 on opposite sides of the annular member 43, the outer diameter of the washers being only slightly less than the diameter of the passageway 36 to permit insertion and facilitate movement through the passageway 36 and positioning therein The inner diameter of the washer 104 is somewat greater than the inner diameter of the ring 43 but somewhat less than the inner diameter of the groove in the face of frusto-conical portion 47 whereby fluid can readily enter said groove past the washer which engages said face. Split resilient retainer rings 105 set into suitable grooves 107 cut in passageway 36 on opposite sides of the washers 104 complete the assemblage 42.

The axial dimension of each assemblage is defined by the position of its rings 105 which prevents any axial distortion or displacement of the packing member, and said rings are readily contracted through the use of suitable tools, inserted in the passageway from either end thereof and permitted to expand and snap into their respective grooves 107.

It will be appreciated that the construction described is extremely simple and requires no complex formations of chambers within the passageway, no liners, no involved apparatus for installing the packing members. The packing rings 43 are held firmly in position by the rings 105, all component parts of the assemblage 42 being readily removable and replaceable.

Attention is now directed to the ram or stem 15 which cooperates with the packing members 43 to provide the valving action desired. The ram 15 is an elongate member extending the length of the passageway 36 and having portions 55, 54, 48, 52, 56 and 59 from left to right respectively in the figures. The diameters of portions 55, 54, 48 and 59 are substantially alike and all slightly less than the inside diameter of the packing members 43 so that these parts will tightly fit in the said rings 43. The parts 48 and 59 are separated by necked or reduced diameter portion 52, and the junction 56 between portions 48 and 52, and portions 52 and 59, is tapered and rounded to prevent damage to the annular rings 43 during movement of the ram. The left-hand portion of the ram 15 has an extended portion 55 integral therewith and of like diameter. Said portion 55 is provided with a center bore therethrough, the purpose of which will be delineated further below. At the opposite end of the ram 15, portion 59 is also provided with a central bore therein similar to that in portion 55. Each of the end portions 54 and 59 is mounted for reciprocation in suitable bearings 89 and 89' respectively, said bearings being held in place in the enlarged portions at each end of the passageway 36 by suitable bearing plates 72 and 74. The bearing plate 72 on the left end of the body 12 has an opening therethrough through which the left hand end of the ram may extend to enable same to be connected to any manner of actuating device such as shown at 14. The right hand bearing plate 74 is provided with a depressed portion on the interior surface thereof which is adapated to seat the end of a helical spring 101 when said spring is inserted in the interior of the bore in ram portion 59.

Generally, the valve structure 10 operates as follows: Presume that the ram is in the rest position as shown in FIG. 2 wherein spring 101 is placed interior the bore of portion 59 of the ram biasing same to the left in said position. Flow of fluid is directed through port 26 into the chamber created by portion 48 of the ram and passageway 36, past the packing assemblage 42 and narrow necked portion 52 thence through port 24. Note that the direction of flow may be reversed through the same route should port 24 be considered as the fluid or source inlet. In the position described and shown in FIG. 2, the packing member 43 of assemblage 44 is disposed upon the left end of the portion 59 and hence no fluid may pass from the passageway 36 to the port 28. The assemblage 42 is axially aligned with the necked portion 52 establishing communication between said port 26 and port 24.

Presume now that the valve is actuated from its rest position and moved to the right against bias of spring 101. Now the alignment of the necked portions of said ram with said assemblages is changed, appearing as shown in FIG. 3, however the spring 101 remains in its position shown in FIG. 2, but is compressed by the stroke of actuating means and is in a ready position to return to the rest position shown in FIG. 2 when the force of the actuating means is relaxed. With the ram in this position, packing assemblage 42 is tightly engaged by the right end of portion 54 of said ram and packing assemblage 44 is axially aligned with the right end of necked down portion 52 permitting communication between port 28 and port 24. Fluid passing through port 28 exerts a pressure upon the packing members 43 of assemblages 42 and 46 expanding them so that they engage the more tightly in the passageway 36 and upon their respective wide diameter portions 54 and 59.

An important feature incorporated in this valve structure and described in great detail in my co-pending application is the means whereby the ram 15 is slightly twisted or rotated axially simultaneously with its reciprocation in passageway 36. The result was that the wider portions engage into the packing members 43 and move along same with less friction than was heretofore possible. In order to accomplish the slight helical movement simultaneously with the reciprocating movement any suitable means may be connected to the ram, such as a slot and pin connection cams, gears, and other means within or without the housing 12, but the means comprising the cam and follower means specifically described and illustrated in said co-pending application is preferred because of its economy, simplicity and effectiveness. For a detailed description thereof, attention is called to the co-pending application referred to. As used herein, said means comprise a shallow helical concave groove 110 acting as a cam, and a ball 112 acting as a follower, said means being disposed in portion 54 of said ram 15, and said ball 112 extending slightly into bore 113 of bearing 89.

The actuating means 14 includes structure which enables the operator of the apparatus to move the ram axially in the housing 12 permitting the limited rotation of the ram 15 in one rotative direction while moving toward the rear of the housing, and in the opposite direction while moving toward the front of the housing 12. The parts of the actuating mechanism utilized herein are similar to that disclosed in my co-pending application and comprise a member 86 of substantially U-shaped horizontal cross-section which provides the fulcrum for the actuator 88, the latter being another component of the mechanism, a pin 95 upon which the actuator is journaled, a retainer 114 which provides a coupling for the actuator and the portion 55 of the ram 15, an actuator pin 122 which also functions as a locking means for said coupling connection, and a helical spring member 101.

The member 86 described above as substantially U-shaped cross-section may be considered as an adapter since it enables the particular manner of reciprocating the ram 15 to be adapted for use with the construction 10. As stated, it is U-shaped in cross section with the U arranged on its side, thereby providing a pair of upstanding walls 87, each having an aligned journal opening 93 of suitable diameter to slidably receive the pin 95. The walls 87 are maintained in spatial relation by the connecting wall 97. A pair of holes are drilled through the adapter 86 in the side walls 87 thereof in alignment with similarly positioned holes in the bearing plate 72 for receiving long screw-threaded bolts 84 adapted to engage tapped holes in the front or left end of the housing 12 to enable the mechanism 14 to be tightly engaged to said end of the housing.

The pin 95 is similar in construction to the pin 122 to be later discussed and is substantially the same construction as said pin described in connection with the actuator structure of my co-pending application. Briefly, said pin 95 has journal ends only slightly less in diameter than the inside diameter of journal openings 93, and has a reduced diameter median portion. This reduced diameter median portion is engaged by the periphery of screws 85 to prevent lateral displacement of the pin 95 along its axis. This is done in a manner similar to that in which the handle shaft described in the aforementioned application engaged a similarly shaped pin. As seen in FIG. 1, a lever arm 94 having a knob 92 at one end, is adapted to be screw-threadedly engaged with the top of actuator 88 by screws 85, and when said lever arm 94 is so secured, lateral movement of said pin 95 is prevented, locking same in place. The actuator 88 is substantially of same configuration as disclosed in my prior structure and for a complete description thereof attention is called to said application.

Attention is now directed to FIG. 4 wherein the novel coupling arrangement is detailed in exploded view showing the relationship of certain of the component parts. The coupling block 114 is in the form of a rectangular block having one passage 120 passing through the same horizontally between opposite walls, and another passageway 121 at right angles thereto, intersecting same but having its axis spaced below the passageway 120. The passageway 120 receives the free end or hollow extension 55 of the ram 15 aligned with the passageway 121. The ends 125 of pin 122 extend partially outward from each side of passageway 121 in assembled condition and serve as pivotal connection to the actuator 88 which is provided with slots in its side walls to receive the ends 125 as seen in FIG. 2 whereby movement of the actuator 88 will reciprocate the ram 15 in the passageway 36 of the valve structure 10. Said pin is locked in the coupling block 114 in much the same manner as pin 95 is locked in place. Both ends of portion 55 of the ram 15 are provided with grooves 116 so that when said portion 55 is inserted in passageway 120 of the coupling block 114, split resilient washers 115 may be snapped into said grooves 116 and the said portion is locked in place.

In my co-pending application, the coupling connection between the ram 15 and the coupling block 114 comprised a pin and slot arrangement wherein the pin comprised a rectangular shaped body having cylindrical small diameter extensions with which pivotal connection to the actuator means was made. This pin was slipped into a similar passageway to passageway 121. A slot or groove was placed near the end of the plunger to be engaged by the rectangular portion of said pin, thereby coupling said ram to the block and hence the linkage. The slot was required to be of such proportion and arrangement whereby rotation of the plunger was permitted but said rotation was of necessity limited because of the pin connection. Obviously, the end of the plunger could not be imperforate and still maintain the necessary slot. Therefor the coupling means used herein is of such great importance. In addition it should be noted that there is no limitation upon the amount of rotation of the plunger, yet coupling of the plunger and connection to said actuator means is permitted without any loss of the advantages of nearly simultaneous rotation and actuation of the plunger 15 in the pasageway 36.

In FIGS. 4 and 6 there are respectively shown the component parts as they are arranged prior to assembly and when assembled to form the actuating structure illustrated in FIG. 3 wherein the rest or normal position of the valve is characterized by communication between ports 28 and 24 allowing passage of fluid therebetween, while port 26 is closed. Actuation of the valve therefore would open port 26 and close port 28. To accomplish this biasing, a helical spring 101 of suitable length is placed between a shallow depression 90, provided on the inner surface of connecting wall 97 of the adapter 86, and the bottom of passageway 123 of portion 55 of ram 15 when said portion is assembled in place in the coupling block 114. Thus in FIG. 6 the coupling block 114 is shown in forward position within the adapter 86, with the helical spring 101 shown in the passageway 123 and seating against the shallow depression 90 provided in wall 97. The actuator 88 is shown pivotally disposed upon the ends of pin 122 and the means whereby rectilineal movement of the ram 15 is translated simultaneously into rotative movement of said ram, comprising the ball 112 and the helical groove 110 in said ram portion 54, is shown with the ball 112 disposed at the left hand end of the helical groove 110, whereby the ram is in the alignment shown in FIG. 3. To actuate the ram movement, the lever arm 94 is lifted upwards, causing the actuator 88 to be pivoted on the end extensions 125 of the coupling block 114, forcing said block to move toward wall 97, compressing spring 101 and carrying along with it the ram 15. When the lever arm 94 is released, the spring 101 immediately forces return of the coupling block to the original rest position. This position causes lever arm 94 to assume broken line position in FIG. 1.

FIG. 2 illustrates the novel valve structure 10 biased in the opposite rest position with the ram and ports aligned so that there is communication between ports 26 and 24 with port 28 being closed. Herein, the helical spring 101 is not located within the actuating means 14 but is disposed within the hollowed area of portion 59 at the right hand end of the ram 15 so that it seats in the shallow depression 91 provided in end plate 74.

The core of the invention herein lies in the capability of the structure to be interchangeably biased in either rest position of the ram merely by interchanging the location of said helical spring 101. Assemblage 14, when assembled, is a unitary structure capable of being separated from the valve body 12 merely by unscrewing of bolts 84. To change the rest position of the valve, said screws 84 are removed, and the actuating means 14 separated from the valve structure by lifting as a unit the lever arm 94, adapter member 86 and actuator 88 from the coupling block 114. It will be seen that lever 94 is engaged by screws 85 to actuator 88 and pin 95. Pin 95 thus rotatably secures lever 94 to actuator 88 and adapter 86. Actuator 88 in turn only engages pin 122 by means of a slot 122′ such as described in the aforementioned application so that it is easily slipped from pin 122 to disengage the adapter 86, pin 95 and handle 94 from pin 122 and the associated block 114. Block 114 remains engaged with ram 54 and pin 122 remains engaged therewith through the coupling effected by portion 55. The spring 101 is then accessible and simply retracted from the aperture 120. The said means 14 including adapter 86, pin 95, lever 94 and actuator 88 is then replaced at the left end of the body 12 without spring 101 and secured thereto by said screw 84. Right end plate 74 is then removed by unscrewing bolts 82; the spring 101 inserted in the hollow end of portion 59 of the ram; and the plate replaced in position and bolted down. Now the rest position is changed. It will be noted that the walls 72 and 74 are provided with unusual functions in that wall 74 can support the spring 101 and serves as a stop means for the ram to limit its movement in a corresponding direction, while wall 72 controls the positioning of the bearing structure 89 to serve as a stop for the peripheral flange on the ram and it also supports the assemblage 14. Truly a unique combination of functions for the wall structures. The difficulties in utilizing walls 72 and 74 for this purpose should be especially noted when it is realized that the cylindrical portions 89 may each hold the ball 112 which in turn must engage the ram slot 110.

While it is true that the construction herein described enables the rest position of the valve structure to be changed at will be the user without the need for adapters, additional parts, or complex procedures, it is perhaps more important for the manufacturer of structures of this kind to be able to change the position of the ram relative to the housing and its ports. Many users of these structures will never change them once purchased and installed, but from user to user the requirements will be different. The location and use of the valve may require the actuating mechanism to be on the right hand side instead of the left, as shown, and the bias of the ram either right or left. The entire assemblage 14 can be installed on the right hand side of the housing by interchanging the same with the plate 74. The ram would be reversed, and the bushings either changed or the right hand bushing 89' provided with a seat for the ball 112 as shown at 119. Thus, the manufacturer need carry no stock. Any structure of the type described, either right or left entry can be made from the identical parts and furnished to the user.

Note that to accomplish the interchangeability of entry of said ram, the location of the ports 26, 28 and 24 must be symmetrical from the right and left hand sides of the valve 10; i.e. port 24 must be located equidistant from the right and left hand sides of the valve housing 12, and the ports 26 and 28 being located similarly symmetrical.

The advantages of the valve structure herein are clearly evident from the description herein and that of my copending application, and it is felt that the nature and advantages of the improvements disclosed in this application have been fully described. However, the invention should not be interpreted as limited to the specific structure shown herein, but should be understood to include the full range of equivalents to which the inventor is entitled in view of the prior art, all as stated in the appended claims.

What is claimed by Letters Patent of the United States is:

1. In a valve structure of the character described which includes a housing having ports for passing fluids and a generally cylindrical bore with a ram axially reciprocating in the bore, the ram and bore having means for selectively connecting the ports during said reciprocating movement, there being a cam and follower connection between the arm and bore to provide a rotative movement of the ram substantially simultaneously with the reciprocating movement; actuating means for said ram comprising, driving means secured to said ram exterior of said housing, means mounted at one end for biasing said ram and driving means in an axial direction out of the bore, stop means for limiting said biased movement, said biasing means comprising a helical spring member, seating means provided in both ends of said ram, said biasing means adapted to be seated in either of said seating means, and coupling means for connecting said ram to said driving means for moving said ram in the direction opposite the direction of said bias irrespective of the end of said housing at which said helical spring is mounted.

2. In a valve structure of the type having a housing with ports therein for passing fluid and a generally cylindrical bore in which a ram is adapted to be longitudinally reciprocated for selectively interconnecting said ports, the improvement comprising a wall at each end of said ram, a housing, means for removably mounting said housing on one wall, driving means mounted on said housing, a coupling located at one end of said ram for engaging said driving means, bias means mounted between said coupling and said housing for urging said ram to a predetermined position, means for disengaging said driving means and said housing as a unit from said coupling to permit access to said biasing means, and means for mounting said bias means between the other wall and the other end of said ram to bias said ram to another predetermined position.

3. The arrangement claimed in claim 2 in which said one wall comprising stop means for said ram when said bias means is mounted between said other wall and said ram and in which said other wall comprises stop means for said ram when said bias means is mounted between said housing and said coupling.

4. In a valve structure of the type having a housing with ports therein for passing fluid and a generally cylindrical bore in which a ram is adapted to be longitudinally reciprocated for selectively interconnecting said ports, the improvement comprising a driving means adapted to be mounted at one end of said ram, bias means adapted to be mounted at either end of said ram for urging said ram in a respective predetermined position, and means mounting said driving means at either end of said bore for operating said ram.

5. The arrangement claimed in claim 4 in which a wall is provided at the other end of said ram and said bias means is arranged to be mounted between said wall and said ram, said wall serving as a stop for said ram when said bias means is mounted at the one end of said ram.

6. In a valve structure of the character described which includes a housing having ports for passing fluids and a generally cylindrical bore with a ram axially reciprocating in the bore, the ram and bore having means for selectively connecting the ports during said reciprocating movement, there being a cam and follower connection between the ram and bore to provide a rotative movement of the ram simultaneously with the reciprocating movement; the improvement comprising biasing means for biasing said ram in one direction, means for mounting said biasing means at either end of said ram, actuating means for moving said ram axially in said bore and means for mounting said actuating means at either end of said bore whereby convertible operation of said ram is afforded through selection of the desired spring bias and relative position of said actuating means.

7. A structure according to claim 6 in which the bore extends completely through the housing, and there is a thrust bearing plate closing off one end of the bore and acting as first stop means for limiting axial movement of the ram, the ram protruding from the other end of the bore, and said means mounting the actuating means including a support member for mounting said actuating means at the second end of the housing from which said ram protrudes, said support member acting as a second stop means for limiting axial movement of the ram in the direction away from said first stop means.

8. A structure according to claim 6 in which the bore extends completely through the housing, there is a thrust bearing plate closing off one end of the bore and providing first stop means for limiting axial movement of the ram, the ram protruding from the other end of the bore, said means mounting the actuating means including a support member for mounting said actuating means at the second end of the housing from which said ram protrudes, said support member acting as second stop means for limiting axial movement of the ram in the direction away from said first stop means, and seating means for said biasing means formed in said stop means.

9. In a valve structure of the type having a housing with ports therein for passing fluid and a generally cylindrical bore in which a ram is adapted to be longitudinally reciprocated for selectively interconnecting said ports, the improvement comprising, a separable housing secured to said first mentioned housing and located at one end of said ram, a driving means mounted on said separable housing, a cam and follower coupling connection between said bore and said ram, a second coupling connection between said ram and said driving means, bias means mounted between said one end of said ram and said separable housing for urging said ram in a predetermined position, means for mounting the bias means at either end of the ram, and means for disengaging said driving means and said separable housing as a unit from said second coupling connection and reengaging said driving means and said separable housing as a unit to said second coupling connection to provide access to said bias means, whereby convertible operation of the said ram is afforded through selection of the desired bias and relative position of said driving means.

References Cited in the file of this patent

UNITED STATES PATENTS

| | | |
|---|---|---|
| 430,689 | Rigg | June 24, 1890 |
| 2,670,008 | Kopp | Feb. 23, 1954 |
| 2,709,446 | Miller | May 31, 1955 |
| 2,855,947 | Lee | Oct. 14, 1958 |
| 2,965,131 | Oros | Dec. 20, 1960 |